Figures 1, 2:
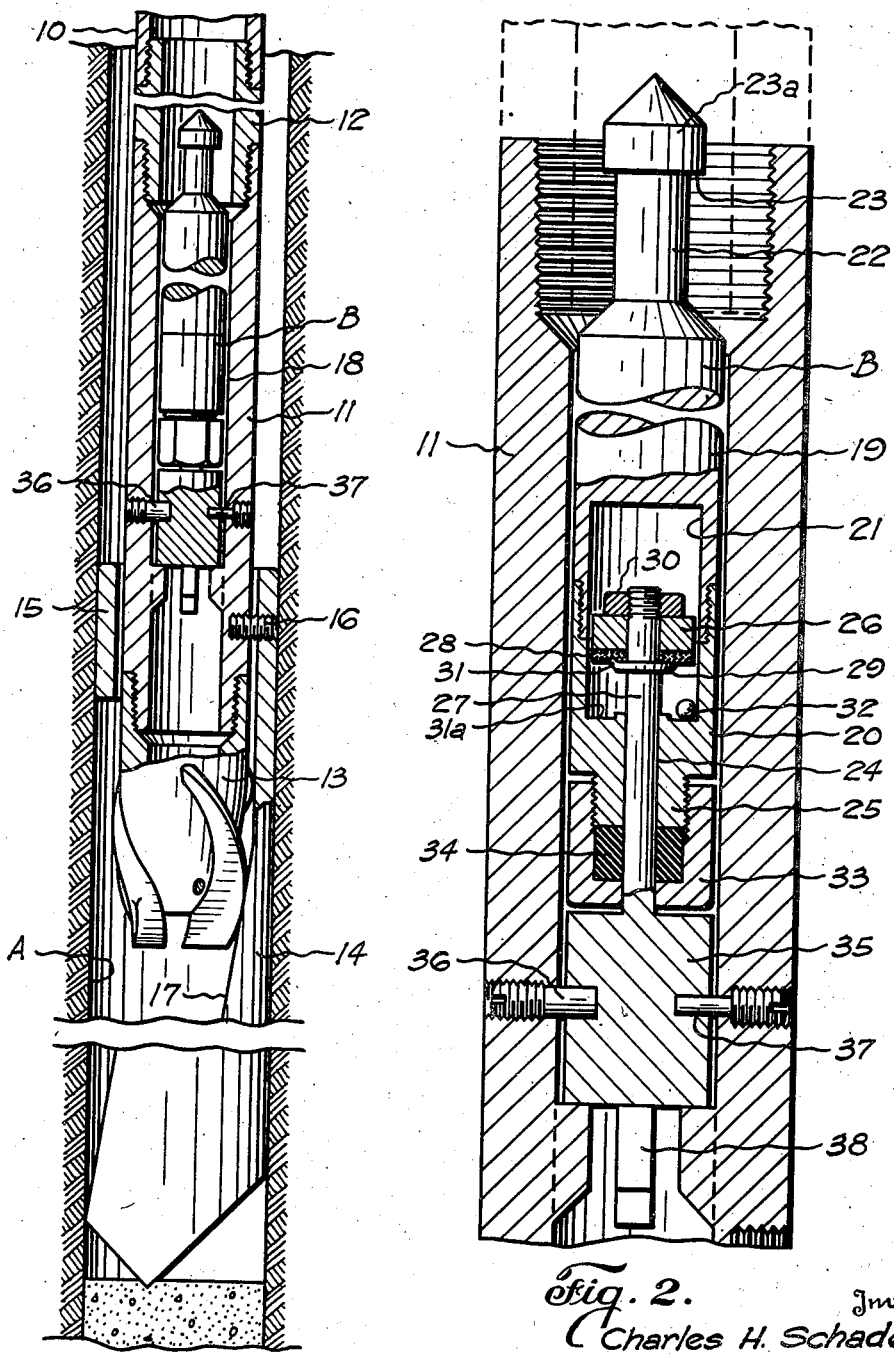

Inventor
Charles H. Schadel

Aug. 13, 1946. C. H. SCHADEL 2,405,717
ORIENTING APPARATUS
Filed Nov. 23, 1942 2 Sheets-Sheet 2

Inventor
Charles H. Schadel
By Jack A. Ashley
Attorney

Patented Aug. 13, 1946

2,405,717

UNITED STATES PATENT OFFICE 2,405,717

ORIENTING APPARATUS

Charles H. Schadel, Houston, Tex., assignor of one-half to Eastman Oil Well Survey Company, Dallas, Tex., a corporation of Delaware, and one-half to Eastman Oil Well Survey Corporation, Long Beach, Calif., a corporation of California Application November 23, 1942, Serial No. 466,708

4 Claims. (Cl. 255—1.6)

This invention relates to new and useful improvements in orienting apparatus.

One object of the invention is to provide an improved apparatus for orienting a well device, such as a whipstock, within a well bore, whereby said device may be located in a predetermined known position in said bore.

An important object of the invention is to provide an improved apparatus for orienting a well device within a well bore including an instrument arranged to be detachably mounted within the well pipe to which the well device is attached, said instrument being mounted in a predetermined position relative to the well device and having means for recording the position of the well device relative to the low side of the hole, whereby when the instrument is withdrawn from the well pipe, the exact location of the well device, with respect to azimuthal "North" may be ascertained.

A particular object of the invention is to provide an improved orienting apparatus including an instrument releasably mounted within the well pipe to which the well device to be oriented is attached; the instrument being so constructed that release of said instrument, as well as actuation thereof to produce a record of the location of the well device relative to the low side of the well bore, is effected by imparting an upward jar on said instrument.

Still another object of the invention is to provide an improved apparatus, of the character described, wherein an upward jar or pull on the instrument will first actuate said instrument to record the position of the well device with respect to the low side of the hole and a subsequent continued jar or pull will effect release of the instrument from the pipe to permit withdrawal of said instrument.

A further object of the invention is to provide an apparatus of the character described, having an instrument for recording the position of the well device to be oriented relative to the low side of the well bore, said device being actuated to make its record by a downward jar thereon and being constructed so that a subsequent upward pull thereon will release said instrument from the well pipe to permit its withdrawal therefrom.

A still further object of the invention is to provide an orienting apparatus having a recording instrument formed of telescoping sections which when moved relative to each other carry out the recording operation, the record so made being formed on a soft impression member which is marked by a gravity-actuated element, such as a ball, plumb-bob or the like; said instrument also having means for releasably connecting it with the well pipe, which means may be a frangible shear pin, releasable latch or other detachable means.

A construction designed to carry out the invention will be hereinafter described, together with other features of the invention.

Figure 3:
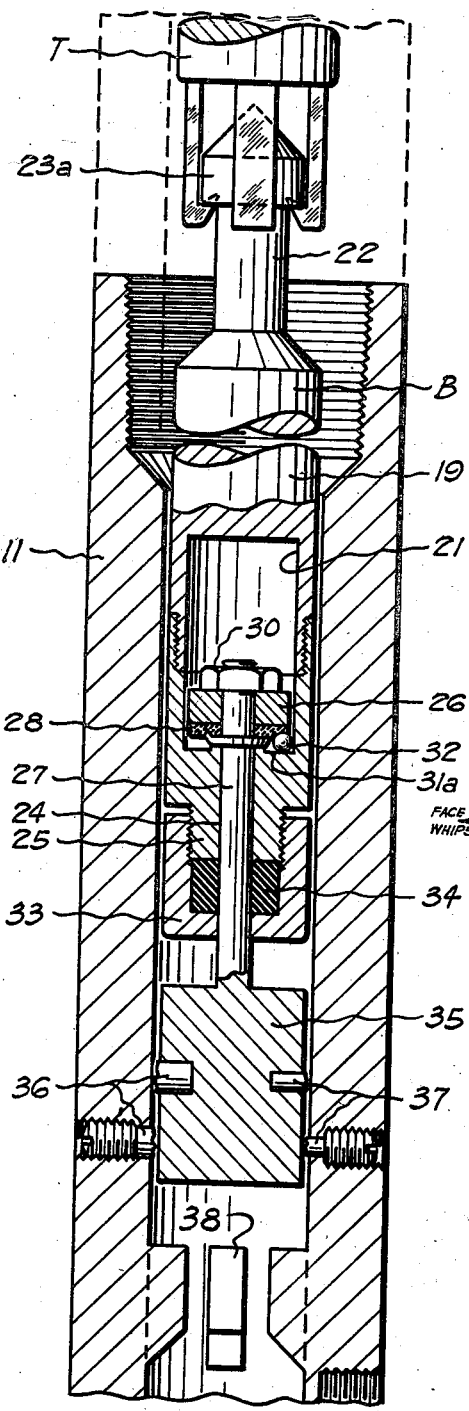
Figure 4:
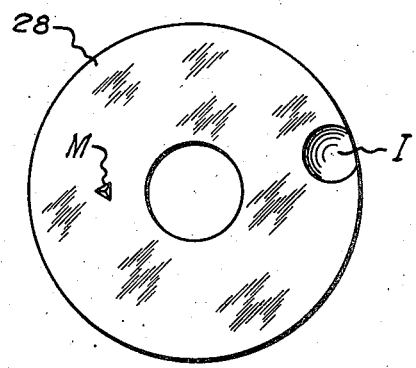
Figure 5:
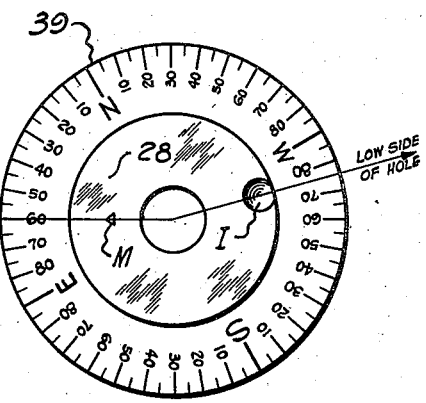

The invention will be more readily understood from a reading of the following specification and by reference to the accompanying drawings, wherein an example of the invention is shown and wherein:

Figure 1 is a view, partly in section and partly in elevation, of an orienting apparatus, constructed in accordance with the invention and showing the apparatus mounted within a well pipe which is disposed in the well bore, Figure 2 is an enlarged, transverse, vertical, sectional view of the instrument mounted within the connecting sub, Figure 3 is a view, similar to Figure 2, and illustrating the instrument in a position after it has been actuated to make the record and also showing said instrument detached or disconnected from the sub, Figure 4 is an enlarged elevation of the impression plate or disk which provides the record, Figure 5 is a plan view of the compass ring into which impression disks or records may be inserted to facilitate interpretation thereof.

In carrying out the present invention, it is first necessary to make a directional survey of the bore hole at the point at which the tool is to be set so as to determine the direction of inclination of the hole at such point. This may be done by any suitable instrument either a gyroscopic or a magnetic instrument and such instrument may be lowered into the well bore on a wire line or cable for the purpose of making the initial survey. An instrument, which is generally known to the trade as a single shot surveying instrument may be employed. By means of the instrument, the degree of inclination or deviation from the vertical, as well as the direction of such inclination may be determined. For example, the instrument may show that the bore hole inclines N. 75 E., or it may show any other reading in accordance with the inclination and direction of the well bore.

After this inclination is obtained by the initial directional survey of the well bore A by any suitable instrument, the drill stem or pipe 10 (Figure 1) is lowered into said well bore. An elongate cylindrical sub 11 is coupled to the lower end of the drill stem or pipe by means of a suitable coupling collar or tool joint 12. A drill bit 13 is screw-threaded onto the lower end of the sub 11, the bit being illustrated as a drag bit although it may be of any suitable type. With this arrangement, it will be obvious that the sub 11 is interposed between the lower end of the drill stem or pipe 10 and the drill bit 13. A whipstock 14, or other well device to be oriented, is adapted to be connected to the sub and includes a collar 15 which is preferably made integral with its upper end. The collar encircles the lower portion of the sub 11, being secured to said sub by means of a shear pin 16. It is noted that the shear pin is preferably located in vertical alinement with the angular face 17 of the whipstock. When the drill stem and/or pipe 10 is lowered through the well bore A, it will be obvious that the whipstock, as well as the drill bit, are lowered therewith. A rotation of the drill stem or pipe will impart a rotation to the whipstock whereby said whipstock will be oriented in the hole in the desired manner so that the whipstock face 17 will be directed in a predetermined direction. After the shear pin 16 has been broken, the drill bit 13, sub 11 and drill pipe 10 may be moved downwardly through the collar 15 of the whipstock and upon such movement, the bit 13 is guided by the angular face of said whipstock. It is noted that this construction, above described, is general practice and forms no part of the present invention.

Obviously, as the drill pipe having the whipstock attached thereto is lowered through the well bore A and finally reaches the position at which said whipstock is to be set, the direction in which the face 17 of said whipstock is directed is not known. In order to continue drilling in the desired direction, the location of the whipstock face, followed by subsequent orientation thereof, must be carried out and for determining the position of the whipstock face after it has been lowered in the well bore, an inclination indicating instrument B is arranged to be mounted within the bore 18 of the sub 11. This instrument, which is clearly shown in Figure 2 includes a tubular body which is constructed of an upper section 19 and a lower section 20, which sections are adapted to be connected together to provide an axially disposed cylinder or chamber 21. The upper section 19 is formed with a fishing neck 22 having an undercut shoulder 23 provided at the base of a head 23a and said shoulder is adapted to be engaged by a fishing tool T (Figure 3), as will be explained. The lower section 20 is formed with a reduced counter-bore 24 which extends downwardly through a nipple 25 formed integral with said section.

A piston 26 is slidable within the cylinder or chamber 21 of the body and is mounted on the upper end of a piston rod 27 which extends axially through the counter-bore 24. The piston rod 27 has a record element in the form of an impression disk 28 mounted thereon and this disk may be constructed of lead or other soft material. The record element or disk is supported upon a collar 29 which is formed integral with the piston rod and said disk is confined between the collar and the piston 26, said piston being retained in engagement with the disk by a suitable nut 30 which is threaded onto the upper end of the piston rod. The supporting collar 29 is provided with an upstanding prong or stud 31 which extends radially of the collar and which engages within the material of which the disk 28 is formed, whereby when the disk is mounted on the piston rod and the piston 26 and nut 30 placed in position, a small mark indicated at M in Figure 4 is formed in the under side of the plate or disk by said prong, this mark providing a fixed indication on said disk.

An annular raceway 31a is formed within the section 20 on the shoulder provided between the counter-bore 24 of said section and the cylinder or chamber 21. A gravity responsive member such as a gravity-controlled ball 32 is confined on the raceway 31a and will obviously roll to the low side of the cylinder or chamber 21. Manifestly, any inclination of the instrument B will result in the ball falling to the low side of such inclination and since the instrument is mounted within the sub 11 and said sub inclines in the same direction as the well bore A, the ball 32 will always roll or fall to the low side of the well bore. Normally, the record element or impression disk 28 is spaced above the ball, as shown in Figure 2 but upon a relative movement of the body of the instrument with respect to the piston 26 and disk 28, the ball will engage the under side of the disk and will form a circular indentation or mark, as indicated at I in Figure 4, on said disk.

The lower end of the piston rod 27 extends downwardly through the nipple 25 on the lower end of the section 20 and extends through a packing box 33 which is threaded onto said nipple. A suitable packing sleeve or collar 34 is confined within the box 33 and packs off around the piston rod. A cylindrical block 35 is made integral with the lower end of the piston rod 27 and is arranged to be detachably and non-rotatably connected to the sub 11 by a pair of diametrically opposed shear pins 36 and 37. The pin 37 is alined with the shear pin 16 which connects the whipstock to the sub and thus, the shear pin 37 is in vertical alinement with the face 17 of the whipstock. The shear pin 37 is of a smaller diameter than the shear pin 36 and the latter pin is vertically alined, or in the same vertical plane as the prong 31 on the collar 29 which supports the impression disk or record element 28. When the shear pins 36 and 37 are connecting the instrument B to the sub 11, the lower end of the block 35 rests upon supporting shoulders or lugs 38 which are provided within the bore of the sub 11, and the provision of these shoulders makes it possible to readily connect the instrument to the sub by means of the shear pins 36 and 37 since the openings in the block 35 are immediately alined with the openings through which said shear pins extend.

In explaining the operation of the apparatus, it will be assumed that the preliminary survey of the well bore A shows that said bore is inclining in the direction N. 75 E. at the point at which the whipstock 14 is to be set. This means that the low side of the well bore at this same elevation is S. 75 W. The apparatus is then assembled at the surface in the position shown in Figure 1, the whipstock being attached to the sub 11 by the shear pin 16 which is in vertical alinement with the face 17 of the whipstock. The instrument B is connected within the bore of the sub 11 by the shear pins 36 and 37. As previously explained, the shear pin 37 is vertically alined with the shear pin 16 and the face 17 of the whipstock and therefore, the opposite shear pin 36 is in the same direction as the face 17 of the whipstock. This latter shear pin 36 is also vertically alined or in the same vertical plane as the upstanding prong 31 on the collar 29 and therefore, the mark M or fixed indication which is formed on the impression disk or record element 28 by said prong is representative of the direction of the face of the whipstock. As explained, the body of the instrument which is composed of the sections 19 and 20 is slidable with respect to the piston 26, impression disk 28 and piston rod 27, as well as with respect to the block 35 which is made integral with said piston rod. Therefore, when the instrument is connected within the sub, the weight of the body moves the body downwardly with respect to the block 35 so that the parts are in the position shown in Figure 2, with the impression disk 28 spaced above the ball 32 which is confined in the raceway 31a of the section 20.

The drill stem is then lowered through the well bore until the whipstock 14 reaches the position at which it is to be set. As explained, the inclination of the well bore A at this point is N. 75 E., but the operator does not know in which direction the face 17 of said whipstock is directed. The apparatus is permitted to stand at rest for a sufficient time to permit the gravity responsive member or ball 32 to fall or roll to the low side of the bore and to come to rest at this point.

A suitable fishing tool T is then lowered by means of a wire line or cable (not shown) and is engaged over the head 23A so as to grip the shoulder 23 of the fishing neck 22. An upward jar or pull is then imparted to the instrument B and this upward pull will result in a lifting or raising of the body formed by the sections 19 and 20 with respect to the remainder of the instrument. Thus, the cylinder 21 is moved upwardly with respect to the piston 26 and impression plate 29, whereby the ball 32 is engaged with the under side of the impression disk or record element 28. When the ball engages such record element or disk, it forms a circular indentation or mark I (Figure 4) and this indentation is representative of the position of the low side of the well bore. A continued upward jarring or pull on the instrument B will result in rupturing or breaking of the shear pins 36 and 37, whereby the instrument B may be withdrawn from the drill pipe 10 and brought to the surface. The sections 19 and 20 are then disengaged from each other after which the nut 30 is removed from the upper end of the piston rod 27, thereby permitting removal of the marked impression disk which forms the record.

As explained, the impression disk has the mark or fixed indication M formed by the prong 31 of the supporting collar, which mark is representative of the face of the whipstock. The circular indentation I which represents the low side of the hole immediately provides the operator with the angular relation between the face of the whipstock and the low side of the well bore. Manifestly, since the inclination of the bore A at this point is known, the direction of the low side of the hole is also known. Assuming the inclination of the bore to be N. 75 E., the position of the low side of the hole as indicated by the indentation I is S. 75 W. By placing the impression disk or record into a compass ring 39 which has the points of the compass displayed thereon, it is possible to quickly and accurately determine the exact direction in which the face 17 is directed. As illustrated in Figure 5, the face of the whipstock is N. 60 E. Of course, the use of the compass ring 39 is optional and it would be possible to determine the angular relation between the mark M and the indentation I by any suitable means.

From the foregoing, it will be seen that a simple and efficient apparatus for orienting the whipstock is provided. The instrument is lowered downwardly with the drill pipe and the whipstock when these parts are first lowered into the well bore. The instrument may be quickly and easily recovered by means of any suitable fishing tool which may be run into the drill pipe on a wire line or cable. A single upward pull or jarring on the instrument not only effects the completion of the record or impression disk but also disconnects the instrument from the sub so as to permit its withdrawal from the pipe.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. An orienting apparatus including, a drill pipe, a well device attached to the lower end of said pipe, an inclination indicating instrument mounted within the bore of said drill pipe, said instrument including, a tubular body defining a cylinder therein, a gravity responsive member mounted in the lower portion of the cylinder and movable to the low side of the cylinder when the instrument is in an inclined position, a piston slidable within the cylinder and normally spaced above the gravity responsive member, a record element mounted on the underside of the piston and adapted to be engaged and marked by the gravity responsive member when the cylinder and gravity responsive member have moved upwardly with respect to the piston and record element, the record element having a fixed indication on its underside, a piston rod having the piston secured to its upper end and having its lower portion projecting from the lower end of the upper section, a block secured to the lower end of the piston rod, means detachably and non-rotatably connecting said block to the drill pipe within which the tubular body is mounted, whereby the piston and record element are held against rotation within the cylinder and with respect to the drill pipe, said detachable means being disposed in a known angular relationship to the fixed indication on the record element and in a known angular relationship to the well device attached to the drill pipe, whereby the angular relationship of the fixed indication to the well device is known, the instrument being actuated, to effect marking of the record element by the gravity responsive member to record the position the low side of the well bore with relation to the fixed indication, by an upward pull upon the tubular body which causes the cylinder of said section to move upwardly with respect to the piston, continued upward pull on said instrument effecting detachment of the connecting means between the block and drill pipe, whereby the entire instrument may be withdrawn from the pipe.

2. An orienting apparatus as set forth in claim 1, wherein the gravity responsive member is a ball and also wherein the record element is an impression disk of soft material which is capable of indentation by the ball.

3. An orienting apparatus as set forth in claim 1, wherein the upper portion of the piston rod is formed with an annular supporting collar, a radially extending marker on the collar, the record element being supported on said collar and engaging the marker which forms the fixed indication thereon, the piston resting upon the record element, and retaining means detachably secured to the upper end of the piston rod for retaining the element and piston on said rod.

4. An orienting apparatus as set forth in claim 1, wherein the detachable means which connects the block of the instrument to the drill stem is a frangible shear pin which is broken by an upward pull on the instrument.

CHARLES H. SCHADEL.